(12) United States Patent
Greif

(10) Patent No.: US 8,167,965 B2
(45) Date of Patent: *May 1, 2012

(54) FILTER FOR CLEANING A FLUID

(75) Inventor: Volker Greif, Harthausen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/189,866

(22) Filed: Jul. 25, 2011

(65) Prior Publication Data

US 2012/0017551 A1 Jan. 26, 2012

Related U.S. Application Data

(63) Continuation of application No. 12/561,663, filed on Sep. 17, 2009, now Pat. No. 8,012,227, which is a continuation of application No. PCT/EP2007/062978, filed on Nov. 29, 2007.

(30) Foreign Application Priority Data

Mar. 23, 2007 (DE) .................... 20 2007 004 476 U

(51) Int. Cl.
*B01D 50/00* (2006.01)

(52) U.S. Cl. ............... 55/337; 55/345; 55/346; 55/347; 55/348; 55/482; 55/385.3

(58) Field of Classification Search ................. 55/337, 55/343, 345, 346, 347, 348, 482, 385.3
See application file for complete search history.

(56) References Cited

U.S. PATENT DOCUMENTS

| | | | | | |
|---|---|---|---|---|---|
| 4,537,608 | A | * | 8/1985 | Koslow | 55/337 |
| 6,572,667 | B1 | * | 6/2003 | Greif et al. | 55/323 |
| 7,004,986 | B2 | * | 2/2006 | Kopec et al. | 55/337 |
| 7,491,254 | B2 | * | 2/2009 | Krisko et al. | 55/337 |
| 7,645,310 | B2 | * | 1/2010 | Krisko et al. | 55/337 |
| 7,799,106 | B2 | * | 9/2010 | Rother et al. | 55/345 |
| 7,905,936 | B2 | * | 3/2011 | Coulonvaux et al. | 55/357 |
| 2004/0040271 | A1 | * | 3/2004 | Kopec et al. | 55/357 |
| 2004/0244586 | A1 | * | 12/2004 | Schaerlund et al. | 95/268 |
| 2006/0101795 | A1 | * | 5/2006 | Krisko et al. | 55/337 |
| 2006/0130445 | A1 | * | 6/2006 | Park et al. | 55/346 |
| 2006/0230724 | A1 | * | 10/2006 | Han et al. | 55/345 |
| 2007/0095030 | A1 | * | 5/2007 | Oh | 55/345 |
| 2007/0214754 | A1 | * | 9/2007 | Kim | 55/345 |
| 2008/0209869 | A1 | * | 9/2008 | Rother et al. | 55/337 |
| 2008/0289140 | A1 | * | 11/2008 | Courtney et al. | 15/353 |
| 2010/0154368 | A1 | * | 6/2010 | Kopec et al. | 55/493 |

* cited by examiner

*Primary Examiner* — Jason M Greene
*Assistant Examiner* — Dung H Bui
(74) *Attorney, Agent, or Firm* — James Hasselbeck

(57) ABSTRACT

A filter for filtering a fluid has a filter housing and a filter element arranged in the filter housing. A cyclone preseparator is arranged upstream of the filter element, wherein a fluid to be cleaned is guided through the preseparator to the filter element. The cyclone preseparator has at least two cyclone cells that have a different diameter, respectively.

9 Claims, 2 Drawing Sheets

FILTER FOR CLEANING A FLUID

CROSS REFERENCE TO RELATED APPLICATIONS

This application is a continuation of co-pending U.S. patent application Ser. No. 12/561,663, filed: 17 Sep. 2009, all the all of the contents of which are incorporated herein by reference and to the fullest extent of the law. U.S. patent application Ser. No. 12/561,663 is a bypass continuation of international application PCT/EP2007/062978 having a filing date of 29 Nov. 2007, the contents of which are incorporated herein by reference in its entirety which claims the benefit under 35 USC 119 of the filing date of foreign application DE 20 2007 004 476.3 filed in Germany on 23 Mar. 2007, the contents of which are incorporated herein by reference in its entirety.

BACKGROUND OF THE INVENTION

The present invention relates to a filter for cleaning a fluid, in particular a gaseous fluid, comprising a filter element arranged in a filter housing and a cyclone preseparator that is arranged upstream of the filter element and by means of which the fluid can be guided into the filter element.

DE 20 2005 009 989 U1 discloses an air filter that is integrated into the intake manifold of an internal combustion engine in order to subject the combustion air to be supplied to the internal combustion engine to a filtration process. The air filter is of a multi-part configuration and comprises a filter element arranged in a filter housing and having a cyclone preseparator as a prefilter arranged upstream thereof. A fine filter is arranged downstream. The cyclone preseparator that has the task to separate the coarse dirt particles contained in the unfiltered air comprises a plurality of parallel arranged tubular flow passages of same diameter. These flow passages open into an ante chamber arranged in front of the filter element in the filter housing. An outlet opening extending outwardly in the radial direction is provided at the ante chamber and by means of the outlet opening the dirt particles that have been separated from the fluid can be removed from the preseparator housing.

The flow passages of identical geometry within the cyclone preseparator are matched to a predetermined nominal throughput. Different throughput parameters require therefore a corresponding adaptation of the cyclone preseparator. A reduction of the diameter of the flow passages in the cyclone preseparator improves the cleaning effect but reduces at the same time the nominal throughput.

SUMMARY OF THE INVENTION

It is an object of the present invention to increase the efficiency of a filter provided with a cyclone preseparator with simple constructive measures.

This object is solved in that the cyclone preseparator has at least two cyclone cells that have a different diameter, respectively.

In the filter according to the invention for cleaning a fluid the filter element arranged in the filter housing has arranged upstream thereof a cyclone preseparator through which the fluid is passed before the fluid that is pre-cleaned in this way subsequently flows through the filter element. The cyclone preseparator comprises at least two cyclone cells of different diameter. A cyclone cell is to be understood as an individual cyclone provided with an inlet opening and an outlet opening and a flow passage connecting the inlet opening and the outlet opening. In the filter according to the invention at least two such cyclone cells are integrated that have different diameters. In this way, the available space can be utilized better in comparison to cyclone cells of same diameter. Moreover, the average degree of separation is increased when using smaller cyclones in comparison to cyclones of greater and identical diameter because the fluid flow that is supplied to the filter element can be purified better, due in part to the higher centrifugal forces on contaminants in the fluid flow when the same flow rate is passed through a smaller capacity/size cyclone. At the same time, the clogging tendency as a result of use of cyclone cells of greater diameter in comparison to the use of uniform cyclones cells of smaller diameter is reduced. Because of the improved utilization of the space and adaptation of the end face of the cyclone a more uniform intake at the downstream filter element is achieved. The uniform intake leads to a longer service life of the filter element.

The combination of several individual cyclones or cyclone cells in the filter can be realized in various ways. One possibility is the integration of the different cyclone cells into the filter housing of the filter element wherein in this embodiment the cyclone cells are fitted into the intake wall of the filter housing. However, it is also possible to combine various cyclone cells in a cyclone block that is arranged upstream of the filter housing and is connected to it. It is also possible to combine both embodiments so that different cyclone cells are combined into a cyclone block that is integrated into the filter housing.

According to an expedient embodiment the free flow cross-section of the greater cyclone cell differs by at least the factor 2 from the free flow cross-section of the smaller cyclone cell. In this way, a minimum size difference is predetermined which, on the one hand, has advantages with regard to space utilization because the small cyclone cells can be inserted into niches between greater cyclone cells or one greater cyclone cell and the sidewall. On the other hand, advantages are achieved with respect to the degree of separation or the utilization spectrum because by means of the greater cyclones the air throughput and by means of the smaller cyclones the degree of separation are increased. Advantageously, a size difference between large and small cyclone cells is desirable that is, for example, greater by the factor 3 or even greater than the factor 3.

A plurality of cyclone cells of same diameter can be provided, for example, two cyclone cells of the same greater diameter, respectively, and two cyclone cells of the same smaller diameter, respectively, can be provided that are distributed across the intake side of the filter. For an appropriate size difference the cyclone cells for an oval filter housing can be expediently distributed in such a way that the two greater cyclone cells are positioned sequentially behind one another in the direction of the major axis of the oval shape and the two smaller cyclone cells are positioned in a transverse direction thereto.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
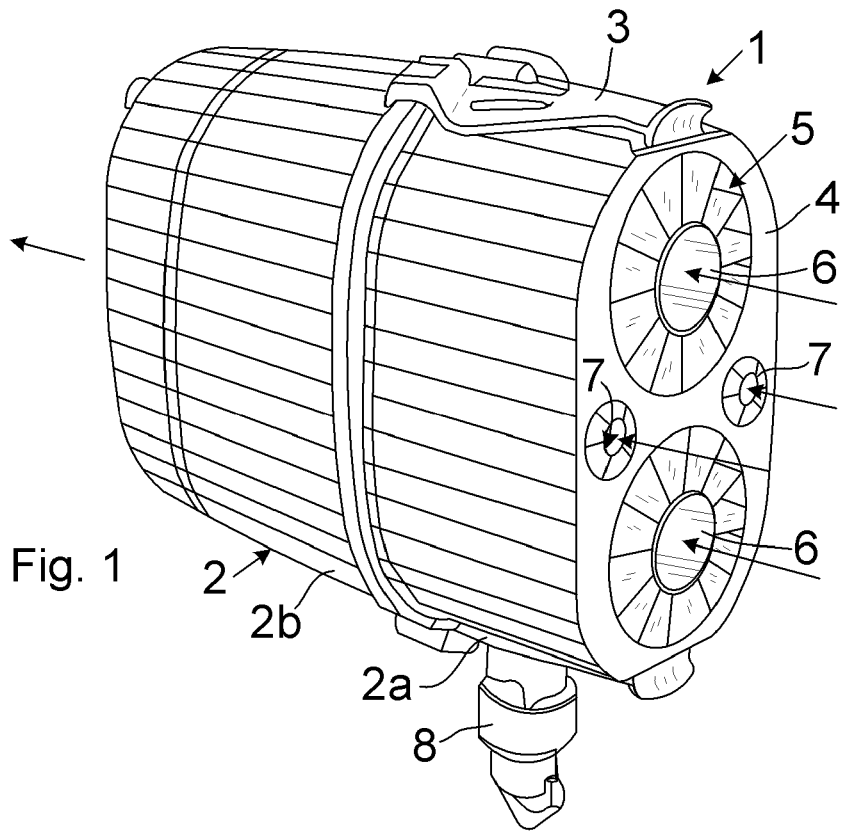
FIG. 1 shows a perspective illustration of a filter that is flown through axially by a fluid to be cleaned wherein the filter housing of the filter has integrated therein a cyclone preseparator at the intake side which cyclone preseparator is comprised of two larger and two smaller individual cyclones or cyclone cells.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a filter for cleaning a fluid, in particular a gaseous fluid possibly having particulate contaminants as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The filter 1 illustrated in FIG. 1 is in particular a gas filter, preferably an air filter that is arranged in the intake manifold of an internal combustion engine. The filter 1 comprises a two-part filter housing 2 whose housing parts 2a and 2b are connected to one another by a releasable closure device 3. In the area of the intake side 4 a cyclone preseparator 5 is integrated into the filter housing 4 and is comprised of several cyclone cells 6 and 7 through which the fluid to be supplied is passed upon intake into the filter housing 2. The individual cyclones or cyclones cells 6, 7 each are provided with vanes through which the axially incoming fluid is imparted with an angular momentum so that dirt particles contained in the fluid as a result of centrifugal force are transported outwardly in the interior of the filter housing 2. By means of a discharge opening 8 located in the front end section of the filter housing 2 that is correlated with the cyclone preseparator 5, the separated dirt particles can be removed from the housing.

Figure 2:
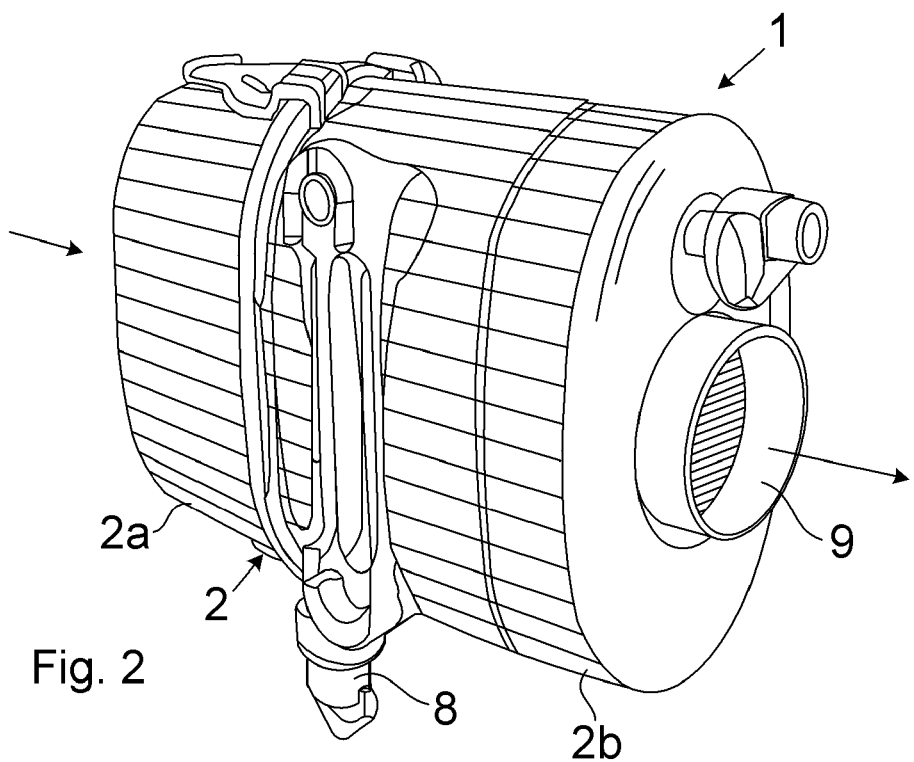
FIG. 2 shows the filter of FIG. 1 in a perspective view onto the outlet side.

In the interior of the filter housing 2, downstream of the cyclone preseparator 5, the filter element is arranged through which the fluid, pre-cleaned in the preseparator, passes axially. By means of outlet opening 9 (FIG. 2) at the end face of the filter housing 2 that is opposite the cyclone preseparator the purified fluid is discharged from the filter 1.

Figure 3:
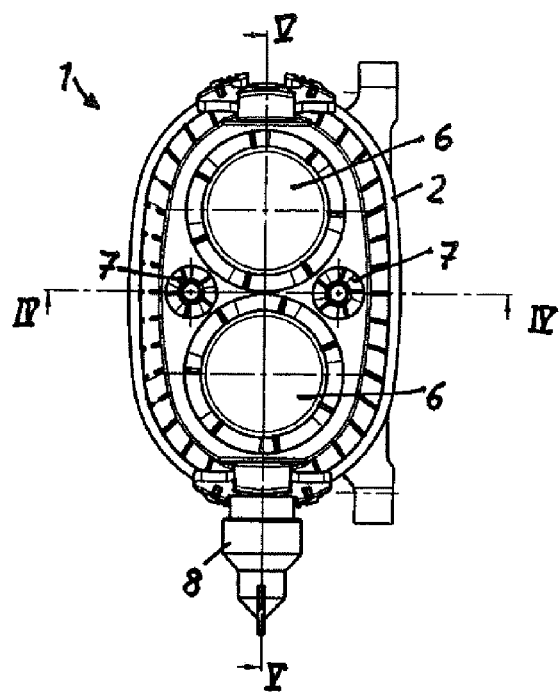
FIG. 3 shows an end face view of the intake side of the filter.
Figure 4:
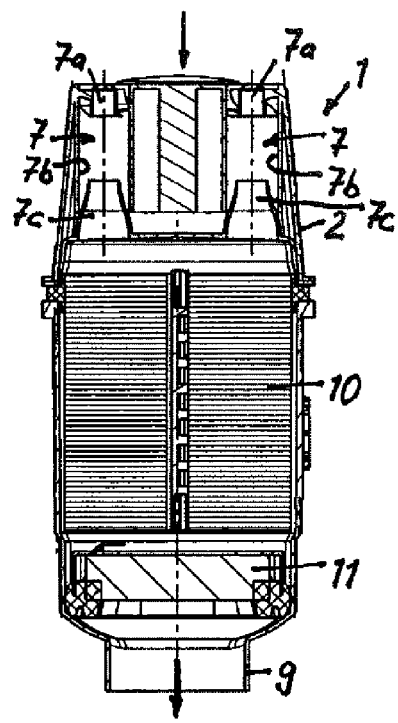
FIG. 4 is a sectional illustration of the filter according to section line IV-Iv of FIG. 3.
Figure 5:
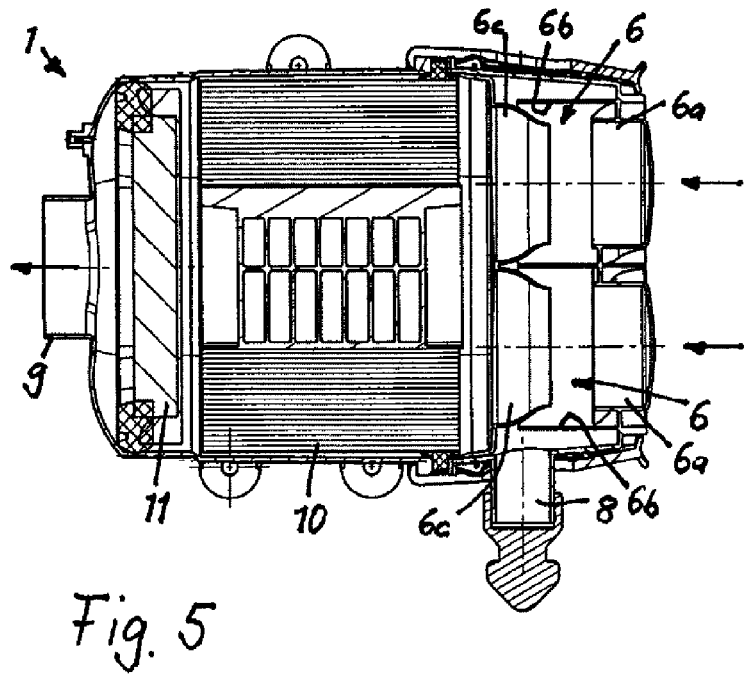
FIG. 5 is a sectional illustration according to section line V-V of FIG. 3.

As can be seen in FIGS. 4 and 5 in connection with FIG. 3, each cyclone cell 6, 7 is comprised of an inlet section 6a and 7a, respectively, a flow passage 6b and 7b, respectively, and an outlet section 6c and 7c. In the flow passage 6b or 7b the heavy dirt particles can be separated and subsequently discharged by means of discharge opening 8 in the filter housing. The pre-filtered fluid is then axially supplied by outlet sections 6c and 7c that widen in the form of a diffuser to the filter element 10 that is located in the central part of the filter 1.

A secondary element 11 is downstream of the filter element 10 and is passed by the fluid coming from the filter element 10. The secondary element 11 has the task to protect the internal combustion engine upon exchange or damage of the filter element 10. Subsequently, the fluid is guided through the outlet opening 9 out of the filter 1.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter for filtering a fluid, the filter comprising:
a filter housing;
a filter element arranged in said filter housing;
a cyclone preseparator arranged upstream of said filter element in a flow direction of a fluid to be cleaned, wherein the fluid to be cleaned is guided through said preseparator to said filter element;
wherein said cyclone preseparator comprises a plurality of cyclone cells fitted into an intake wall of said filter housing, a first portion of said cyclone cells having a larger diameter than a second portion of said cyclone cells, said second portion of cyclone cells having a smaller diameter relative to said first portion,
wherein each cyclone cell includes an inlet section arranged at a first axial end of said cyclone cell through which incoming fluid enters said cyclone cell, said inlet section arranged on said filter housing intake wall;

an outlet section arranged at an opposing second axial end of said cyclone cell through which pre-filtered fluid exits said cyclone cell, said outlet section arranged within said filter housing and in fluid communication with an inlet side of said filter element, wherein said inlet section and said outlet section are aligned on the same axis, wherein said larger diameter cyclone cells are positioned sequentially aligned along a first axis on said filter housing intake wall, wherein said smaller diameters cyclone cells are inserted into niches in said intake wall between adjacent larger diameter cyclone cells or between one larger diameter cyclone cell and a sidewall of said filter housing, and wherein a free flow cross-section of one of said larger diameter cyclone cells is at least twice as large as a free flow cross-section of one of said smaller diameter cyclone cells.

2. The filter according to claim 1, wherein said at least two cyclone cells are integrated into said filter housing.

3. The filter according to claim 1, wherein a free flow cross-section of a first one of said at least two cyclone cells is at least twice as large as a free flow cross-section of a second one of said at least two cyclone cells.

4. The filter according to claim 1, wherein said at least two cyclone cells are combined into a cyclone block arranged upstream of said filter housing.

5. The filter according to claim 1, wherein said at least two cyclone cells each have at least one flow passage through which the fluid to be cleaned is guided to said filter element, wherein said flow passages of different ones of said at least two cyclone cells have different diameters.

6. The filter according to claim 1, wherein at least two of said cyclone cells have same diameter.

7. The filter according to claim 1, wherein four of said cyclone cells are provided and wherein two of said four cyclone cells have a first diameter and two of said cyclone cells have a second diameter, wherein said first diameter is larger than said second diameter.

8. The filter according to claim 1, wherein said filter housing has an oval cross-section.

9. The filter according to claim 1, wherein said filter element is flown through in an axial direction and wherein said cyclone cells are arranged upstream of said filter element in said axial direction.

* * * * *